US008522727B2

(12) United States Patent
McBounds (10) Patent No.: US 8,522,727 B2
(45) Date of Patent: Sep. 3, 2013

(54) LEASH HANDLE

(76) Inventor: Derrick McBounds, Detroit, MI (US)

( * ) Notice: Subject to any disclaimer, the term of this patent is extended or adjusted under 35 U.S.C. 154(b) by 0 days.

(21) Appl. No.: 13/294,823

(22) Filed: Nov. 11, 2011

(65) Prior Publication Data

US 2012/0137978 A1    Jun. 7, 2012

Related U.S. Application Data

(60) Provisional application No. 61/412,424, filed on Nov. 11, 2010, provisional application No. 61/628,908, filed on Nov. 8, 2011.

(51) Int. Cl.
*A01K 27/00* (2006.01)

(52) U.S. Cl.
USPC .............................. 119/796; 119/72

(58) Field of Classification Search
USPC .......................... 119/795, 796, 72
See application file for complete search history.

(56) References Cited

U.S. PATENT DOCUMENTS

| 7,044,080 | B2 | 5/2006 | Rabello | |
| 7,845,506 | B2* | 12/2010 | Willows et al. | 215/382 |
| 2005/0087148 | A1* | 4/2005 | Rabello | 119/796 |
| 2006/0207522 | A1* | 9/2006 | Perkitny | 119/796 |
| 2006/0219182 | A1 | 10/2006 | Rabello | |
| 2008/0173257 | A1* | 7/2008 | Steiner et al. | 119/796 |
| 2010/0043721 | A1 | 2/2010 | Cigan | |
| 2011/0139090 | A1* | 6/2011 | Harruna | 119/796 |
| 2011/0290188 | A1* | 12/2011 | Lopez et al. | 119/72 |
| 2013/0000566 | A1* | 1/2013 | Berton | 119/796 |

FOREIGN PATENT DOCUMENTS

WO    WO 2010019842 A1 *    2/2010

* cited by examiner

*Primary Examiner* — Son T Nguyen (74) *Attorney, Agent, or Firm* — John R. Benefiel (57) ABSTRACT

A pet leash handle includes a hollow housing formed with a grip opening, and having a spring loaded wind up reel rotatably mounted within the housing on which a leash is wound which may be unwound against the resistance of a wind up spring, said leash extending out of said housing via a guide opening therein. An elongated water bowl is detachably mounted along a lower side of the housing in which a water bottle is nested. A bag storage cavity is provided within the housing above the lower side of the housings and a release button operates a mechanism which locks or releases the wind up reel.

8 Claims, 7 Drawing Sheets

LEASH HANDLE

CROSS REFERENCE TO RELATED APPLICATIONS

This application clams the benefit of U.S. provisional application No. 61/628.908, filed on Nov. 8, 2011 and U.S. provisional application No. 61/412,424 filed on Nov. 11, 2010.

BACKGROUND OF THE INVENTION

This invention concerns pet restraints, and more particularly dog leashes which are commonly used and sometimes required by law to restrain a dog while taking the dog out on walks.

Local laws have imposed increased restrictions on pet control, including requiring the use of leashes and pick up of droppings using disposable plastic bags.

Dog leashes using wind up to reels have been proposed to allow shortening and lengthening of the leashes when out on a walk to conveniently restrict or increase the allowed range of movement of the pet while on the leash.

It has been proposed to provide various accessories attached to a leash handle, such as a light, water containers, etc.

It is an object of the present invention to provide a compact dog leash handle that effectively combines several conveniently useable features.

SUMMARY OF THE INVENTION

The above object and other objects which will be understood upon a reading of the following specification are achieved by a pet leash handle comprises of a hollow housing formed with a grip on the rear upper side of the handle, with a spring operated retractable leash reel mounted therein on which a leash is initially wound and may be pulled out against the spring resistance, its allow retraction by the spring.

The leash is routed out of the housing through a guide slot at the forward end. A spring loaded lock or release button is located just forward of the grip, operating a lock or release mechanism which interacts with the reel when depressed to either lock or release the reel, allowing a selected length of the unwound leash to be set or to be retracted by the extent of wind up of the reel. The mechanism allows selective engagement of the reel by a fork element to lock the leash or retract the fork element to release the reel with successive pushes of the lock or release button.

A water bottle is held in an elongated water bowl which is releasably held in position against a bottom side of the handle housing. A pair of retention tabs at either end of the housing are received in respective slots at either end of the bowl to attach the dish to the housing. One tab can be retracted by operation of a spring loaded release button located in the housing at one end of the lower side to release the bowl and water bottle. The water bottle is configured to be nested within the bowl with a flatten angled neck and cap at one end and a central bulge to maximize the volume of water held by the bottle.

An opening in a bottom wall of the housing is exposed when the dish and bottle are removed and when a closure panel is removed allows loading of a roll of plastic disposal bags into an internal cavity, the bags able to be pulled out through a port in a rear end of the housing.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figures 1, 2:
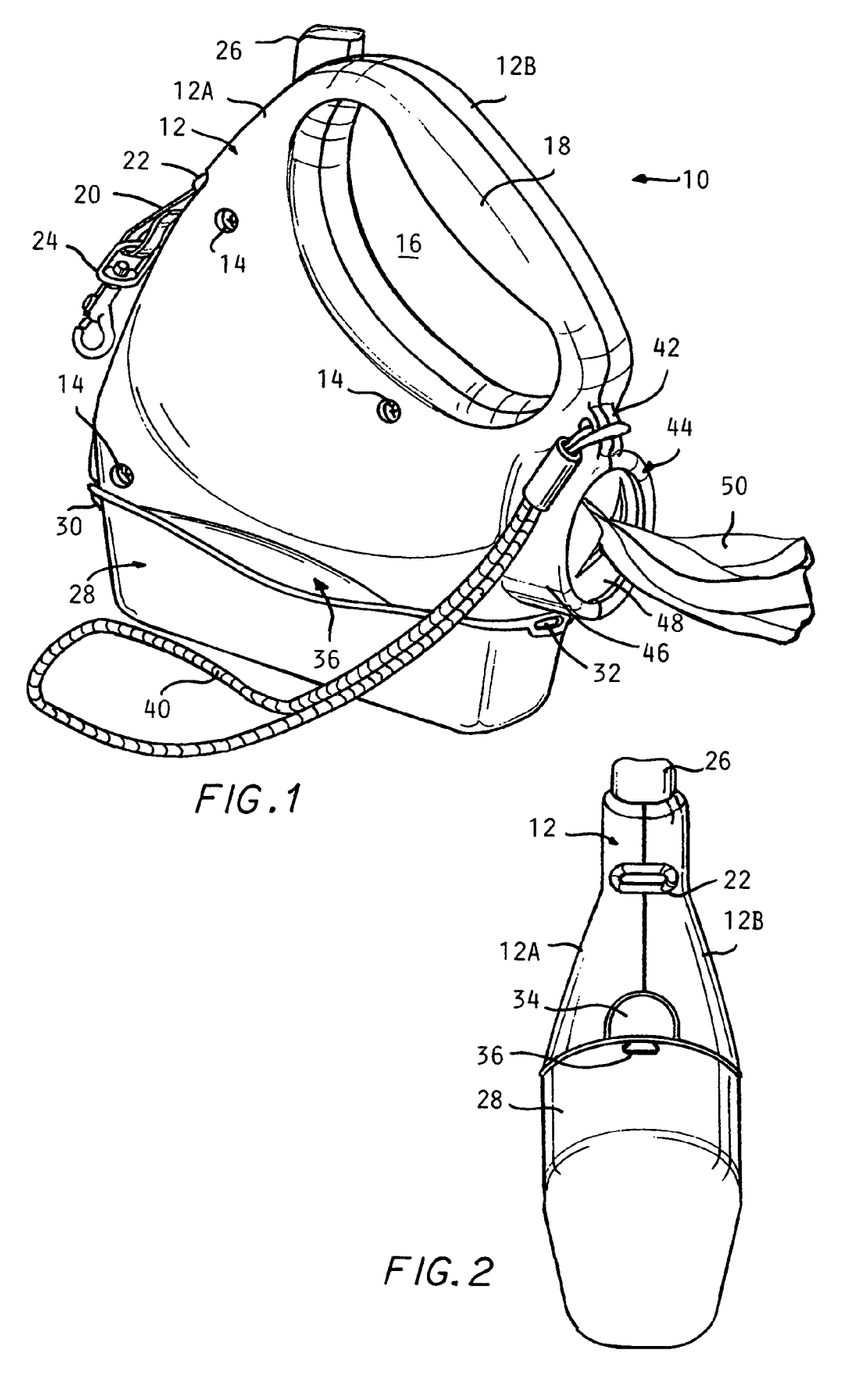
FIG. 1 is a pictorial view from the rear of a leash handle according to the invention, with a leash end protruding from a guide slot on the front end, a wrist strap attached to the back, and a waste bag protrude from a feed port on the back end.
FIG. 2 is a front end view of the leash handle shown in FIG. 1, in a tilted up position.
Figure 3:
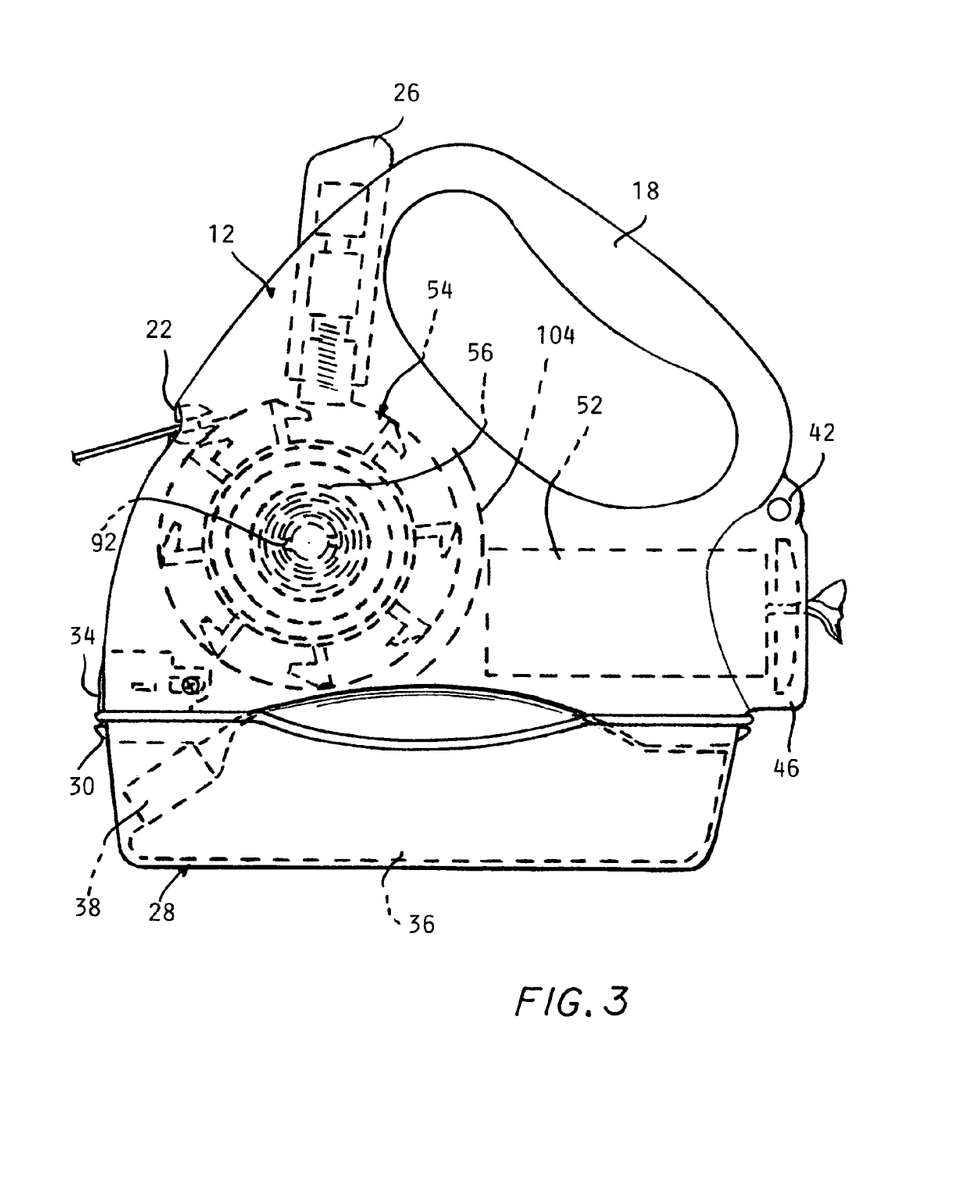
FIG. 3 is a side elevational view of the leash handle shown in FIGS. 1 and 2.

Referring to the drawings and particularly FIGS. 1 and 2, a leash handle 10 according to the invention is shown. A molded plastic two piece housing 12 includes parts 12A, 12B which are held together with screws 14 passed through spacer posts molded into the housing parts in the well known manner.

An opening 16 formed in each of the housing parts 12A, 12B creates a grip 18 at the top and a rear end of the housing 12. A leash 20 is fed out through an opening guide 22 at the front of the housing 12, with harness or collar connectors 24 attached at the free end.

A lock or release push button 26 projects upwardly and is used to lock or release wind up or payout of the leash 12 from a wind up reel described hereinafter.

An elongated drinking bowl 28 is detachably held on the bottom side of the housing 12 by retention elements as tabs 30, 32 received in a mating slots in each of the opposite ends of the bowl 28 from the housing.

The front tab 30 may be retracted by operation of a release push button 34 to enable release the bowl 28.

Nested within the bowl 28 is a plastic water bottle 36 generally contoured to maximize its volume capacity, bulging up in its center to fit a concave bottom wall 32 of the housing 12.

The bottle 36 is flattened at its front end with a cap 38 on a pour opening projecting from the flattened cup. This shape accommodates the presence of the release push button 34.

A wrist strap 40 is also provided secured in aligned eyes 42 molded into housing parts 12A,12B.

A disposal bag dispenser port 44 is provided at the rear of the housing 12 comprised of a round protuberance 46 found by molded features of the housing parts 12A, 12B, closed off by a plastic disc 48 held in a groove in the protuberance having radial cuts therein to allow a bag 50 to be pulled out from a roll of bags 52 disposed within a bag storage cavity in the housing 12 below the grip opening 16 and above and to the rear of the bottom wall of the housing 12.

A wind-up reel 54 is rotatably mounted within the housing 12 on a slotted molded on mounting tube 92, with a wind up spring 56 tensioned by pulling a leash wound on the reel 54 so that the leash 20 tends to be rewound onto the reel 54 when released.

A lock-release mechanism 58 is operated by successive pushes of the lock-release push button 26. This mechanism 50 includes a fork element 60 which can be moved up and done on a fixed post 62 used to hold the housing parts together with one of the screws 14. This movement is against the resistance of a spring 63 (FIGS. 5,6) as described hereinafter. Slots 61 in the legs 63 accommodate the movement on the post 62 while limiting the extent of movement.

The lock release mechanism 58 utilizes an extension-retraction mechanism 59 of a known type used in ball point pens, whereby the fork element 60 may be alternatively held extended to engage the periphery and hold the reel 54 against rotation or retracted to be free of the reel 54 to allow rotation of the reel 54.

Such extension and retraction mechanisms are described in U.S. Pat. Nos. 4,991,988; 2,905,147; 3,191,329; 3,144,005; and 3,137,276, incorporated herein by reference.

Figure 5:
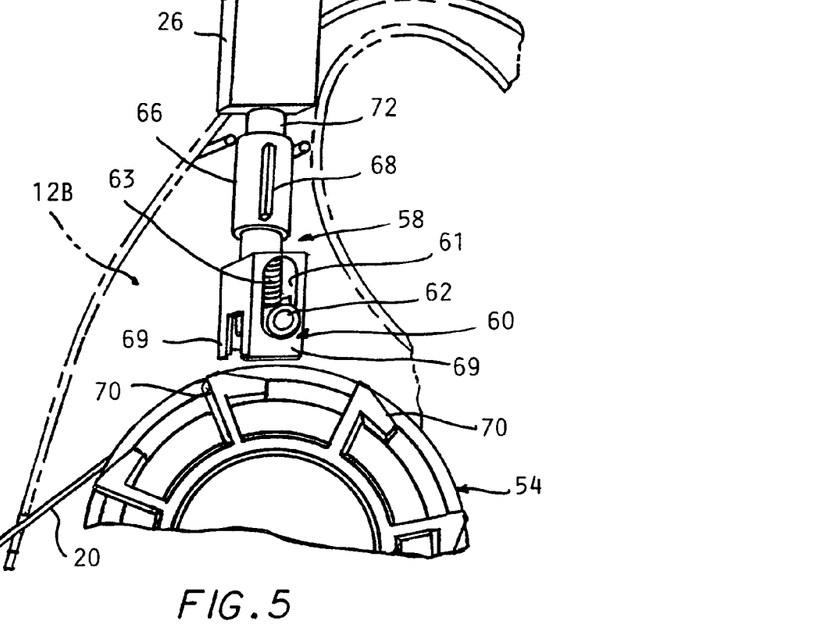
FIG. 5 is an enlarged fragmentary view of the leash handle showing a wind up reel locking mechanism in a released condition.
Figure 6:
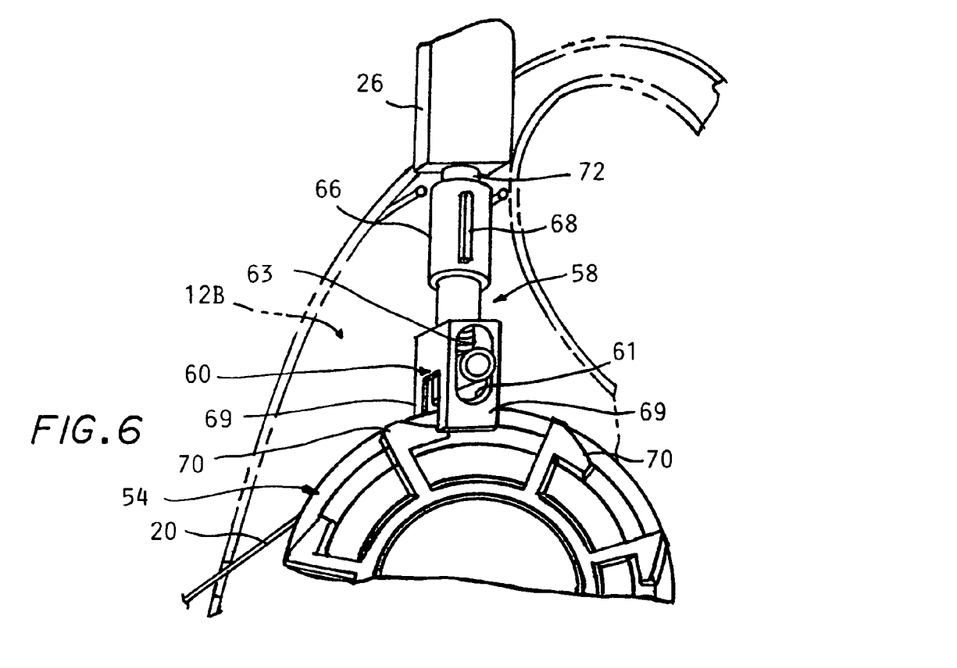
FIG. 6 is a view of the fragmentary view of the leash handle with the wind up reel in a locked condition.
Figure 9:
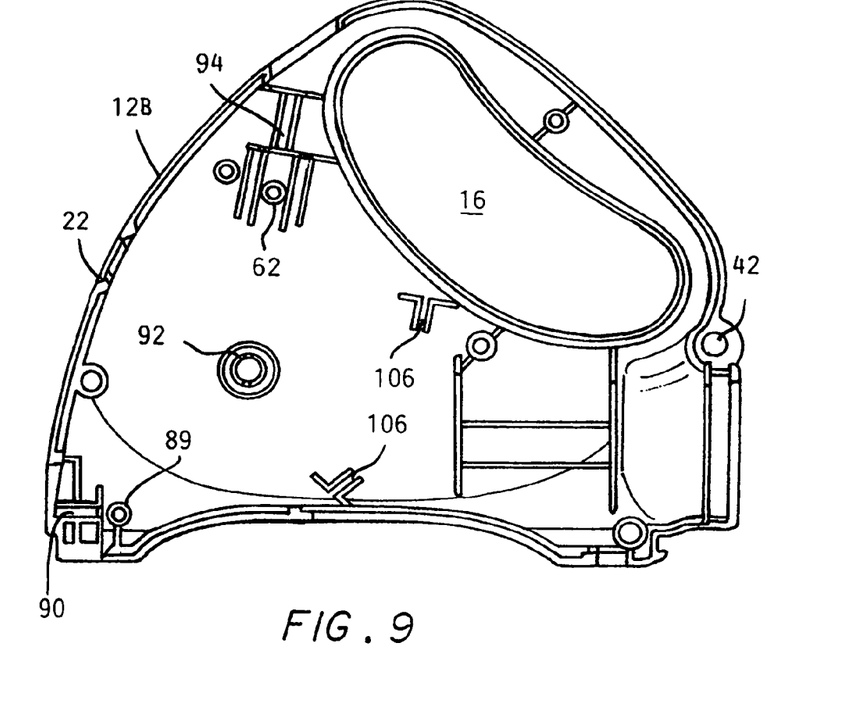
FIG. 9 is a view of the open side of one of two housing part.

Referring to FIGS. 5 and 6, the lock and release mechanism 58 includes the fork element 60, which has a spring 63 interposed between the post 62 and the inside of the fork element 60 urging the fork element 60 up as seen in FIG. 5. A guide tube 66 is fixed axially by a pair of opposite wing positions 68 each received in a slot 92, 94 (FIG. 9) molded into the inside of a respective housing part 12A, 12B.

When the lock or release push button 26 is depressed, the fork element 60 is moved down so that legs 63 straddle the outer periphery of the reel 54. Raised features 70 are either side of the reel 54 will engage the legs 63 to prevent the reel 54 from rotating. When the button 26 is released, the fork element 60 will retract to the position shown in FIG. 5 to release the reel 54 or remain in engagement to maintain the locking of the reel 54 as seen in FIG. 6, depending on the state of the mechanism 59.

As noted above the extension-retraction mechanism 59 is an application of the well known "ball point pen retraction mechanism" in which successive depressions of the push button 26 will alternately cause the fork element 60 to be retracted out of engagement with the reel 54 by the spring 62 or will be held extended in engagement therewith. This is accomplished by an upper toothed element 72 slidable in guide tube 66 which as a series of axial raised ribs 74 on its inside diameter defining slots 76 which each receive one of the teeth on the upper toothed element 72. This prevents rotation of the upper toothed element 72 in the guide tube 66. A shoulder 78 on the upper end of the tube 66 prevent the upper toothed element 72 from being pushed completely out of the guide tube 66.

A lower toothed element 80 has a socket receiving a protuberance 61 on the fork element 62 to be engaged thereby, the spring 62 pushing up on the element 80 forcing it upward within the guide tube 66. A tail 82 on the lower toothed element 80 is received in a bore in the upper toothed element 76 and slidable therein.

The teeth 81 on the lower toothed element 80 engage the ends of the ribs 74 and also the spaces between the teeth 73 on the upper toothed element 72. The number of teeth 81 on the lower toothed element 80 is only half of the number of teeth 73 on the upper toothed element 72 and the number of slots 76 in the guide tube 66.

In a similar manner of the "ball point pen retraction mechanism", each stroking of the push button 26 causes the surfaces to cause a one tooth indexing of the lower toothed element 80 such that the teeth 81 are alternatively aligned or misaligned with the slots 76 of the guide tube 66. When aligned the lower toothed element 80 can move up within the guide tube 66 with its teeth 81 aligned with three of the slots 76. This is described in further detail in the patents referenced above.

When misaligned, the teeth 81 abut the ends of the ribs 74 so that the lower toothed element 80 cannot move all the way up the guide tube 66. The net result is that it holds the forked element 60 in its down position preventing the force of spring 62 from disengaging it from the reel 54, to lock the reel 54 against rotating.

Figures 7, 7A:
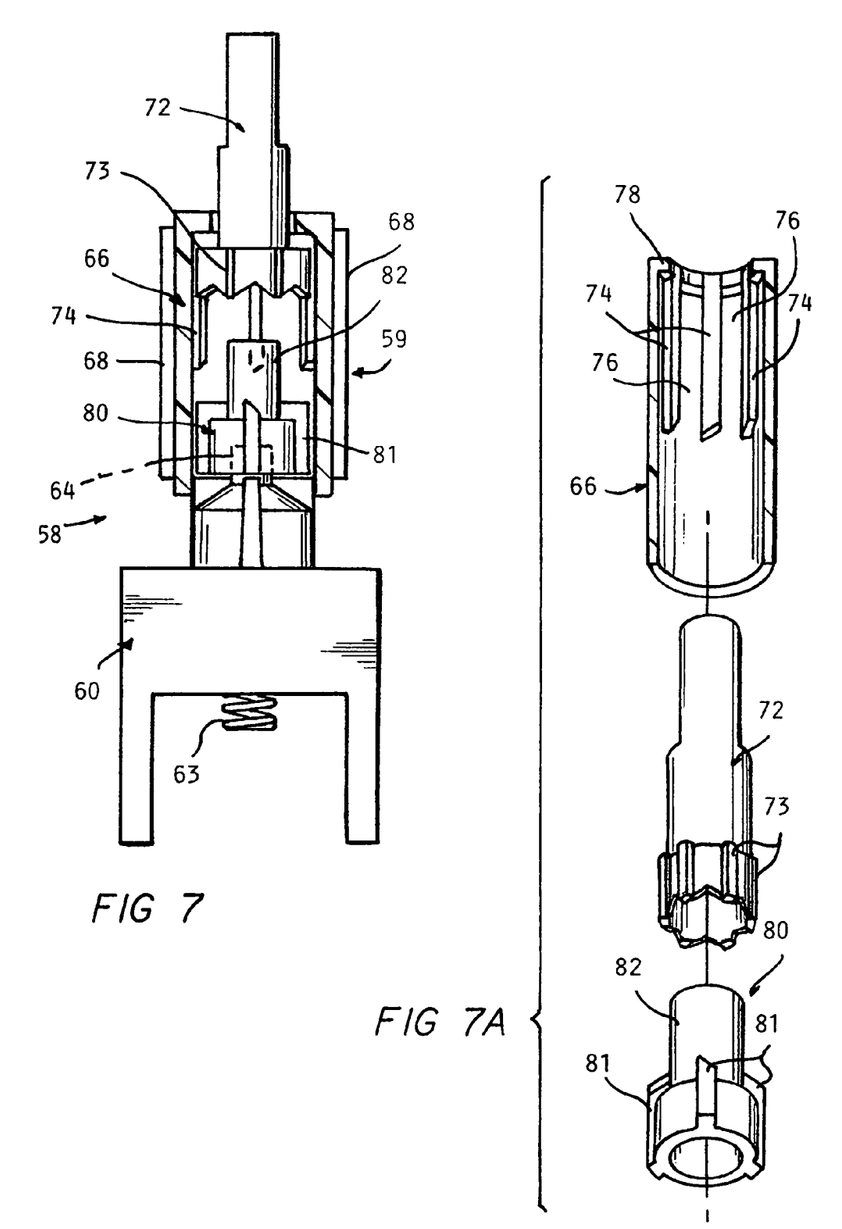
FIG. 7 is an enlarged side view of components of a locking-release mechanism for the wind up reel.
FIG. 7A is an exploded pictorial view of an extension-retraction mechanism included in the locking-release mechanism.
Figure 7B:
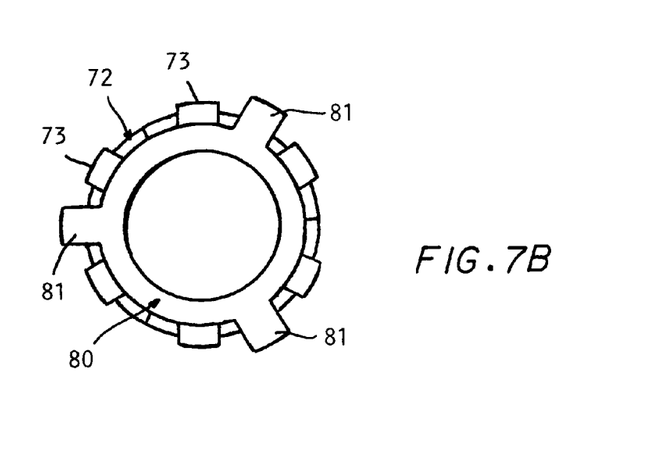
FIGS. 7B and 7C are sectional views of mating components in the extension retraction mechanism.
Figures 7C, 8:
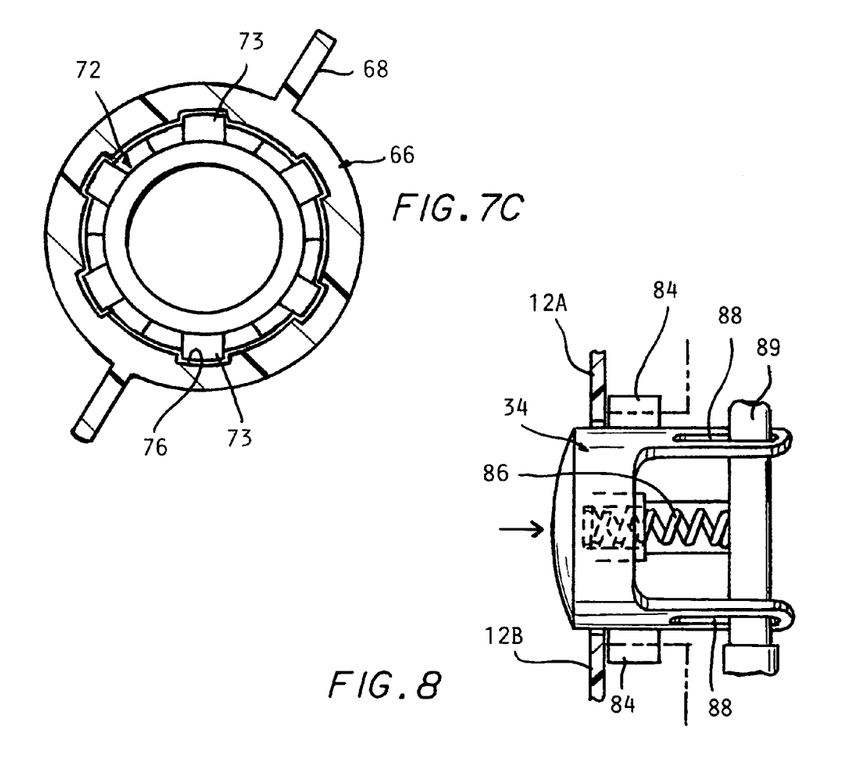
FIG. 8 is an enlarged top view of a bowl release button and associated housing structure.

FIG. 8 shows additional details of the bowl release push button 34 and its installation.

A pair of opposite side tabs 84 move within slots 88 molded in each housing part 12A, 12B to guide the same. A spring 86 is interposed between button 34 and a fixed post 89 fixed in the housing. A pair of slots 90 accommodate the post 88.

Thus the button 34 will move back after being pushed and released to allow removal of the bowl 28 (and bottle 36).

Figure 4:
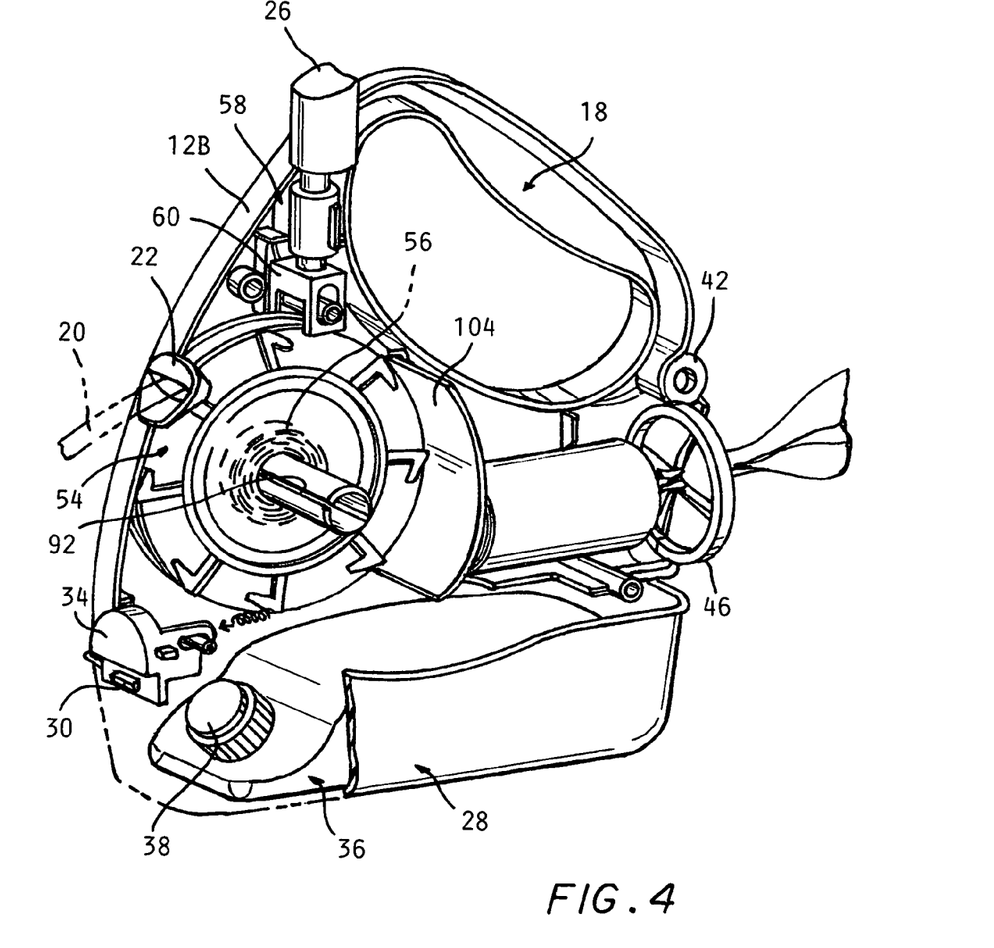
FIG. 4 is a pictorial view from the front, with one half of the housing removed and a bottom mounted drinking dish partially broken away.
Figure 10:
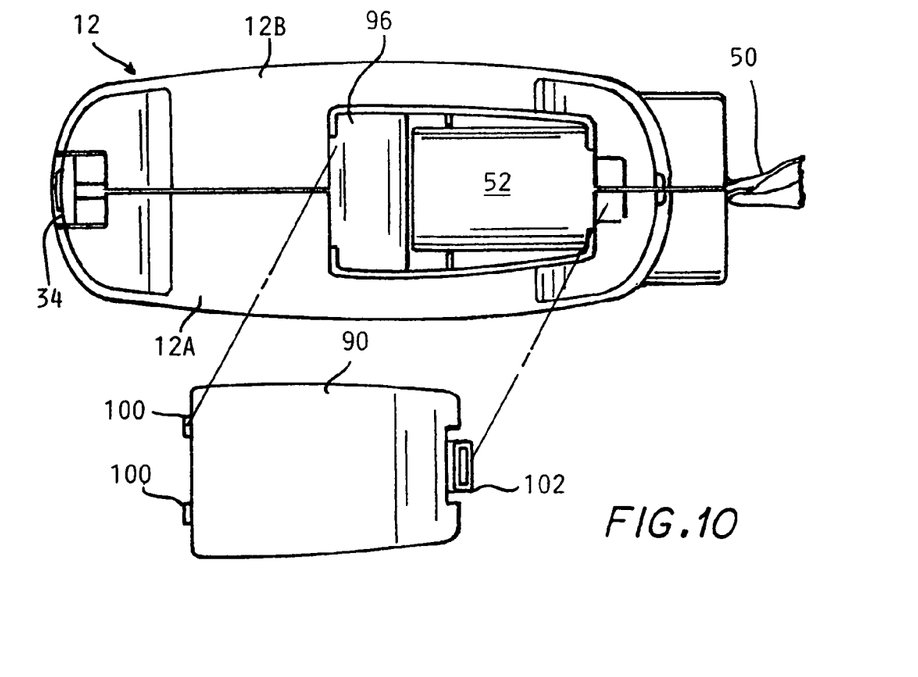
FIG. 10 is a bottom view of the handle housing with a removable closure panel shown removed from an access opening in a bottom wall of the housing.

FIG. 10 shows the bottom side of the housing 12 visible with the bowl 28 removed. An access opening 96 into a bag storage bag is normally covered with a closure panel 98, held with tabs 100 and flexible retainer 102. When the closure panel 98 is removed the roll of bags 52 can be loaded into a housing cavity 53 (FIG. 4).

A curved partition 104 (FIG. 4) may optionally be installed, held in slots 106 (FIG. 9) formed in the housing parts 12A,12B to isolate the reel 54 from cavity 53.

The invention claimed is:

1. A pet leash handle comprising:
   a hollow housing;
   a wind up reel rotatably mounted within said housing, with a spring resisting rotation of said reel in one direction, and a leash able to be wound onto said reel against the resistance of said spring;
   said leash passing out of said housing through an opening at a front wall of said housing therein;
   said housing having a grip at a rear wall of said housing formed thereon for holding said handle;
   said housing having an elongated bottom wall extending between two sides of said housing bottom side and said top of said housing;
   an elongated bowl releasably held against said elongated bottom wall and of width matched to that of said bottom wall;
   an elongated water bottle nested within said bowl a generally fit to the contour of said bowl to maximize its volume capacity held against said side of said housing.

2. The leash handle according to claim 1 further including a retention element normally engaging said bowl to hold said bowl against said side of said housing, and an externally accessible release button operable to move said retention element so as to disengage the same from said bowl, and thereby enable removal of said bowl from said bottom wall of said housing.

3. The leash handle according to claim 2 wherein said water bottle has a flattened and angled surface at one end, with a capped outlet extending normally out from said flattened end surface, and wherein said externally accessible release button is located above said flattened angled end surface of said bottle.

4. The leash handle according to claim 2 wherein said retention element is located at one end of said side of said housing and another fixed retention element is provided at an opposite end of said side of said housing to secure opposite ends of said elongated bowl to said bottom wall.

5. The leash handle according to claim 1 further including a cavity in said housing just above said bowl in which is disposed a roll of plastic disposal bags aligned with said bowl, and a port at the rear wall of said housing adjacent said cavity allowing withdrawal of said bags therethrough.

6. The leash handle according to claim 5 wherein said side of said housing has an inner wall extending over said bowl when in place on said housing bottom wall, said inner wall having a removable closure panel, said cavity located adjacent said closure panel, said roll of bags able to be loaded therein after removal of said bowl and said closure panel.

7. The lease handle according to claim 1 further including an externally accessible lock or release button mounted to said housing adjacent to said grip, and a release or lock mechanism operable by successive depressions of said lock or release button to thereafter keep said reel locked against rotation or alternatively to keep said reel released for rotation induced by said wind up spring after successive depressions of said lock or release button.

8. The leash handle according to claim 7 wherein a fork member is alternatively positioned by said release or lock mechanism in or out of engagement with a periphery of said reel.

* * * * *